United States Patent [19]
Swartzel et al.

[11] Patent Number: 5,105,724
[45] Date of Patent: Apr. 21, 1992

[54] APPARATUS FOR PASTEURIZING LIQUID WHOLE EGG PRODUCTS

[75] Inventors: Kenneth R. Swartzel, Raleigh; Hershell R. Ball, Jr., New Hill, both of N.C.

[73] Assignee: North Carolina State University, Raleigh, N.C.

[21] Appl. No.: 662,487

[22] Filed: Feb. 28, 1991

Related U.S. Application Data

[62] Division of Ser. No. 468,066, Jan. 23, 1990, Pat. No. 5,019,407.

[51] Int. Cl.$^5$ .............................................. A23C 19/00
[52] U.S. Cl. ...................................... 99/453; 99/483; 99/497
[58] Field of Search ................. 99/330, 451, 453, 467, 99/470, 483, 516, 497–500, 353, 355; 426/388, 399, 495, 521, 614

[56] References Cited

U.S. PATENT DOCUMENTS

| | | | |
|---|---|---|---|
| 3,113,872 | 12/1963 | Jones et al. | |
| 3,616,262 | 10/1971 | Coady et al. | 99/509 X |
| 3,830,149 | 8/1974 | Kaufman | 99/452 |
| 4,237,145 | 12/1980 | Risman et al. | 99/451 |
| 4,463,666 | 8/1984 | Papp | 99/497 |
| 4,534,282 | 8/1985 | Marinoza | 99/483 |
| 4,695,472 | 9/1987 | Dunn et al. | 99/451 |
| 4,808,425 | 2/1989 | Swartzel et al. | 426/399 |
| 4,838,154 | 6/1989 | Dunn et al. | 99/483 |
| 4,957,760 | 9/1990 | Swartzel et al. | 426/399 |

FOREIGN PATENT DOCUMENTS 0326469 8/1989 European Pat. Off.

OTHER PUBLICATIONS

Kline, L. et al., "Heat Pasteurization of Raw Liquid Egg White," *Food Technology* 19, 105 (Nov. 1965).
Sugihara et al., "Heat Pasteurization of Liquid Whole Egg," *Food Technology* 20, No. 8, 100 (Aug. 1966) (Reprint).
Seymour Catalogue Sheets from Seymour Model Number 103 Automatic Egg Breaker/Separator (4 pages), date unknown.

*Primary Examiner*—Timothy F. Simone
*Attorney, Agent, or Firm*—Bell, Seltzer, Park & Gibson

[57] ABSTRACT

Disclosed is a method of pasteurizing a liquid whole egg product in a continuous stream. The method comprises the steps of: (a) providing an egg yolk product stream and an egg white product stream; (b) heating the egg yolk product stream to a predetermined temperature greater than the highest temperature of the egg white product stream; and then (c) recombining the egg yolk product stream and the egg white product stream to form a whole egg product stream, the whole egg product stream having (e.g., equilibrating to) a second predetermined temperature; wherein the total thermal treatment received by the liquid whole egg product during the process is at least sufficient to pasteurize the product. An apparatus useful for carrying out the method of the present invention is also disclosed.

7 Claims, 1 Drawing Sheet

APPARATUS FOR PASTEURIZING LIQUID WHOLE EGG PRODUCTS

CROSS REFERENCES TO RELATED APPLICATIONS

This application is a divisional application of co-pending prior application Ser. No. 07/468,066, filed with the U.S. Patent Office on Jan. 23, 1990, now U.S. Pat. No. 5,019,407.

BACKGROUND OF THE INVENTION

The present invention concerns a method and apparatus for pasteurizing liquid whole egg products in which the product is split into two streams for initial heat treatment and then recombined for completion of heat treatment.

Large quantities of liquid egg products are pasteurized each year to produce products sold in refrigerated form with limited shelf life. See generally, *Egg Pasteurization Manual* (USDA Agricultural Research Service 1969). More recently, the provision of techniques for ultrapasteurizing liquid egg products has led to considerable interest in marketing liquid egg products which have extended shelf lives under refrigerated conditions.

M. Hamid-Samimi et al., in *IUFOST Symposium on Aseptic Processing & Packaging of Foods Proceedings*, 229 (Symposium held Sep. 9-12, 1985, in Tylösand, Sweden), concerns ultrapasteurizing liquid egg in which the egg is heated by contacting to a heated surface. See also U.S. Pat. No. 4,808,425, issued Feb. 28, 1989.

U.S. Pat. No. 3,113,872 to Eynon Jones discloses a method of treating liquid egg products (shown schematically in FIG. 2 therein) which employs (a) a first heating step in which liquid egg is contacted to a heated surface, (b) a first vacuum evaporation and cooling step, (c) a second heating step in which liquid egg is contacted to steam, and (d) a second vacuum evaporation and cooling step.

T. Sugihara et al., *Food Technology* 20. 1 (1966) discloses a method of treating liquid whole egg (shown schematically in FIG. 1 on page 4 thereof) which employs (a) a first heating step in which liquid egg is contacted to a heated surface, (b) a second heating step in which the liquid egg is contacted to steam, and (c) a vacuum evaporation and cooling step. L. Kline et al., *Food Technology*, 105 (November 1965), at page 114, report a method of processing liquid egg white similar to the method of processing liquid whole egg disclosed by Sugihara et al., supra.

Co-pending patent application Ser. No. 312,066 of Swartzel, Ball, and Liebrecht, titled "Ultrapasteurization of Liquid Whole Egg Products with Direct Heat," and filed Feb. 16, 1989, discloses a method of ultrapasteurizing a liquid whole egg product in which the product is initially heated to a first predetermined temperature in a first heating step. The product is then maintained at the first predetermined temperature for a first predetermined holding time. Next, the product is heated to a second predetermined temperature in a direct heating step. The product is then maintained at the second predetermined temperature for a second predetermined holding time sufficient to cause the desired bacterial kill in the product. The product is then cooled and aseptically packaged to provide a packaged liquid whole egg product having a shelf life of at least four weeks under refrigerated conditions. In a preferred embodiment of the invention disclosed therein, the product is heated by steam injection in the direct heating step and then cooled without the use of a vacuum chamber.

Ultrapasteurization processes which contact the liquid whole egg product to a heated surface produce products of excellent quality, but have limited run times due to eventual fouling of the heated surface. Ultrapasteurization processes which contact the liquid whole egg product to steam make longer run times available, but the relative severity of the steam contact step usually results in a lower quality product. In view of the significant demand for ultrapasteurized liquid whole egg products, there is a need for new ultrapasteurization processes which provide greater control over the process so as to make longer run times with higher quality products possible. The present invention is based on our ongoing efforts to provide improved techniques for pasteurizing and ultrapasteurizing such products.

SUMMARY OF THE INVENTION

Disclosed is a method of pasteurizing a liquid whole egg product in a continuous flow apparatus. The method comprises the steps of: (a) providing an egg yolk product stream and an egg white product stream; (b) heating the egg yolk product stream to a predetermined temperature greater than the highest temperature of the egg white product stream; and then (c) recombining the egg yolk product stream and the egg white product stream to form a whole egg product stream, the whole egg product stream having (e.g., equilibrating to) a second predetermined temperature; wherein the total thermal treatment received by the liquid whole egg product during the process is at least sufficient to pasteurize the product. Preferably, the whole egg product stream is held at the second predetermined temperature for a time sufficient to cause a nine log cycle reduction in *Listeria monocytogenes* in the liquid whole egg product.

The step of recombining the egg yolk product stream and the egg white product stream is preferably carried out by injecting either the egg yolk product stream into the egg white product stream, or the egg white product stream into the egg yolk product stream.

The method may optionally include the step of removing cholesterol from the egg yolk product stream before the step of recombining the egg yolk product stream and the egg white product stream.

An apparatus for pasteurizing a liquid whole egg product is also disclosed. The apparatus comprises (a) an egg yolk product line; (b) an egg white product line; (c) first pumping means connected to the egg yolk product line for establishing an egg yolk product stream in the egg yolk product line; (d) second pumping means connected to the egg white product line for establishing an egg white product stream in the egg white product line; (e) a heater connected to the egg yolk product line for heating the egg yolk product stream to a first predetermined temperature; (f) recombining means connected to the egg yolk product line after the heater and connected to the egg white product line for producing a whole egg product stream from the egg yolk product stream and the egg white product stream; and (g) a whole egg product line connected to the recombining means for receiving the whole egg product stream.

The method and apparatus of the present invention enable each constituent of the liquid whole egg product to be heated in a manner most appropriate for that constituent. With the present apparatus, holding times and temperatures can be tailored to each constituent stream. By providing the final heat-imparting step to the egg white product stream by means of recombining it with an egg yolk product stream heated to a higher temperature, the more heat-sensitive egg white constituent of the final product can be heated to the highest temperature it attains during the process without contacting it to either a heated surface or steam.

BRIEF DESCRIPTION OF THE DRAWING

The FIGURE schematically illustrates an apparatus for carrying out the present invention.

DESCRIPTION OF THE PREFERRED EMBODIMENTS

Figure 1:
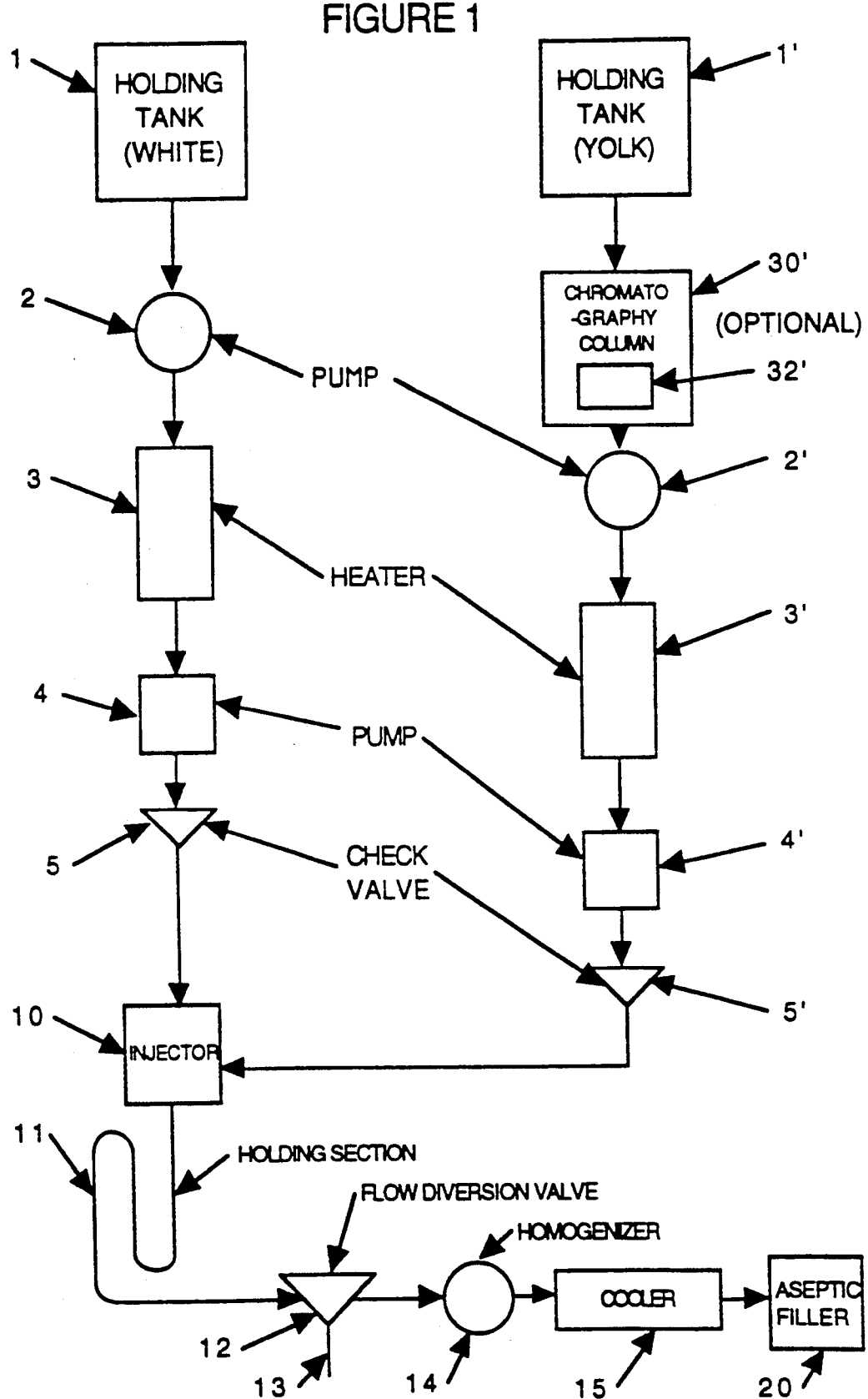

Examples of pasteurized liquid whole egg products which may be produced by the method of the present invention include whole egg, fortified whole egg (whole egg with added yolk), salt whole egg (e.g., salt 10%), sugar whole egg (e.g., sugar 10%), blends of whole egg with syrup solids, syrups, dextrose and dextrins and/or gums and thickening agents, blends of whole eggs with less than 1% sugar and/or salt, scrambled egg mixes (for example, a mix of about 51% egg solids, 30% skim milk solids, 15% vegetable oil and 1.5% salt), reduced cholesterol egg products and blends thereof, custard blends, and the like, that is, products containing at least about 10% egg solids. Products which are extremely sensitive to thermal processing and which are particularly suitable for ultrapasteurization by the present invention include, for example, liquid whole egg and blends thereof (less than 2% added non-egg ingredients), fortified whole egg and blends thereof (24-38% egg solids, 2-12% added non-egg ingredients), liquid salt whole egg, liquid sugar whole egg, and other liquid whole egg blends which are 24-38% egg solids and 12% or less of added non-egg ingredients. Terms used herein have their standard meaning in accordance with industry and regulatory usage. See. e.g., 7 C.F.R. §59.570(b) (1985).

Any means for establishing respective constituent streams (i.e., the egg yolk product stream and the egg white product stream) may be used to carry out the present invention. Pumps used to establish streams may or may not be positive displacement pumps, though positive displacement pumps (timing pumps) are generally needed to precisely define the holding time of a product stream in a holding section Positive displacement pumps may be used in combination with other pumping means, such as centrifugal pumps.

Ingredients may be added to or removed from the various product streams in the present method at any location to provide the various liquid whole egg products given above. The addition and removal of water, and the removal of cholesterol, are discussed specifically below. In another embodiment of the invention, the liquid yolk product stream consists only of liquid egg yolk (cholesterol optionally removed), the liquid white product stream consists only of liquid egg white, and the liquid whole egg product stream consists only of liquid whole egg (cholesterol optionally removed). Minor ingredients, such as salt, or citric acid or phosphate to stabilize color, may be included in all embodiments.

At least the egg yolk product stream is heated prior to recombining it with the egg white product stream. The egg white product stream may optionally be heated (and is preferably heated) prior to the recombination step, though it is not heated to as high a temperature as the egg yolk product stream.

How the constituent product streams are heated is not critical The respective product streams may be heated by contacting them to a heated surface (indirect heat), as described in U.S. Pat. No. 4,808,425 (the disclosure of which is incorporated herein by reference), or heated by contact to or by the injection of steam (direct heat), as described in commonly owned U.S. patent application Ser. No. 07/312,066, filed Feb. 16, 1989 (the disclosure of which is incorporated herein by reference). Preferably, however, the egg white product stream, if heated, is heated by contact to a heated surface rather than by contact to steam.

A cholesterol removal step may optionally be included in the process of the present invention. Since egg cholesterol is located in yolk, the cholesterol removal step need only be carried out on the yolk product stream. The particular cholesterol removal procedure employed is not critical. One exemplary process employing cyclodextrins to bind cholesterol is disclosed in A. Bayol et al., European Patent Application No. 89400175.9, Process for Elimination of Steroids from a Substance of Biological Origin (Laid open Aug. 2, 1989). Other exemplary processes are disclosed in U.S. Pat. Nos. 4,234,619, 3,882,034, and 3,607,304, the disclosures of which are incorporated herein by reference. Preferably, however, cholesterol is removed by passing the yolk product stream through a chromatography column, which chromatography column contains cyclodextrin immobilized on a solid support. Preferably β-cyclodextrin is immobilized on the solid support, and preferably the chromatography column is positioned in the pasteurizing apparatus so that the yolk product stream is passed through the column before it is heated. Any solid support suitable for use in processing food may be employed. The solid support may be a silica support, with the cyclodextrin immobilized thereon in the manner described in U.S. Pat. No. 4,781,858 to F. Mizukami et al.; the solid support may be glass beads, with the cyclodextrin immobilized thereon in the manner described in U.S. Pat. No. 4,087,328 to Swaisgood (all patent references cited herein are to be incorporated herein by reference). The immobilized cyclodextrin may optionally be separated from the yolk product stream by a semipermeable membrane permeable to the cholesterol, as described in U.S. Pat. Nos. 4,714,556 and 4,361,484 (e.g., by passing the yolk product stream through the lumen of a capillary bed formed from a semipermeable membrane material, with the cyclodextrin immobilized on a solid support located on the opposite side of the capillary bed membrane).

There may optionally be holding sections included for each constituent product stream prior to the recombination step. It is not essential that the holding times imparted by these two sections to their respective constituent streams be the same. In one embodiment of the invention, as discussed below, holding sections for constituent product streams are kept to a minimum prior to the recombination step. In another embodiment of the invention, also discussed below, holding sections prior to the recombination step are sufficient to impart a nine log cycle reduction in Salmonella to each constituent product stream, with the heat treatment after the recombination step sufficient to bring the total thermal treatment imparted by the process to a level sufficient to produce a shelf stable refrigerated product as described below (and preferably sufficient to impart a nine log cycle reduction in Listeria to the product).

Constituent product streams may be recombined by any means, such as by emptying the two streams into a holding tank or mixing tank for a predetermined time. However, recombination of the constituent product streams is preferably carried out by injecting one of the constituent product streams into the other. It is most convenient to inject the stream of smaller volume into the larger volume stream, which generally means injecting the egg yolk product stream into the egg white product stream. This transfers heat from the egg yolk product stream, which has been raised to a temperature higher than the egg white product stream, to the more heat-sensitive egg white product stream. The whole egg product stream formed by this recombination is optionally temperature equilibrated by an in-line static mixer in the liquid whole egg product line immediately after the recombining means, and before any holding section.

If desired, the transfer of heat from the egg yolk to the egg white can be enhanced by adding water to the egg yolk product stream prior to its first heating step, and then removing the water from the recombined whole egg product stream after the holding step. Water may be removed by means such as a vacuum chamber (which would also serve to cool the product) or reverse osmosis.

The total thermal treatment received by the liquid whole egg product during the process (that is, both before and after the recombination step) must be sufficient to cause at least a nine log cycle reduction of Salmonella bacteria in the product (i.e., sufficient to pasteurize the product). Proper thermal treatment is typically insured by presetting the holding times, either of the constituent product streams prior to their recombination, of the liquid whole egg product stream after recombination, or both. The term "holding time," as used herein, has its ordinary meaning as used in the industry, and all log cycle reductions referred to herein concern processed product as compared to raw or unprocessed product. Preferably, the thermal treatment is sufficient to produce a product having a shelf life of about four weeks to about thirty-six weeks under refrigerated conditions, and more preferably a product having a shelf life of about eight weeks to about thirty-six weeks under refrigerated conditions. The term "refrigerated," as used herein, means stored at a temperature of 4° Centigrade.

Most preferably the holding time for the liquid whole egg product stream is sufficient to cause a nine log cycle reduction in *Listeria monocytogenes* (Listeria) in the product. Part of this reduction may be provided by thermal treatment carried out prior to the recombination step. In one embodiment of the invention, the thermal treatment carried out on the constituent product streams prior to the recombination step is sufficient to pasteurize the liquid whole egg product product, and the thermal treatment carried out after the recombination step is sufficient to insure that the total thermal treatment (before and after recombination) can cause a nine log cycle reduction in Listeria therein. Listeria is found in a wide range of animals (including man), on plants, and in soil. See Microbiology, 799-800 (B. Davis et al. Eds., 3d Ed. 1980)(Harper & Row). A treatment capable of causing a nine log cycle reduction in Listeria is preferred because the wide-spread nature of Listeria makes it difficult to exclude from a pasteurizing plant, because of the pathogenic nature of this microorganism, see Id., and because Listeria appears capable of growing to large quantities in egg under refrigerated conditions (the conditions contemplated for the products of the present process before they are prepared and eaten by a consumer).

To obtain a product with reduced quantities of microorganisms, the pasteurizing apparatus should be sterilized before the liquid whole egg product is passed therethrough. Sterilizing is preferably accomplished by passing hot water under pressure through the pasteurizing apparatus, as is known in the art, so that hot water is contacted to those surfaces which contact the product at a temperature and pressure and for a time sufficient to sterilize these surfaces.

In addition, the product, after pasteurization, should be aseptically packaged. Aseptically packaged means packaged to the exclusion of microorganisms other than those carried by the liquid egg product itself. Equipment suitable for aseptically packaging liquid egg products is commercially available. Also useful in carrying out this step is equipment which packages the product to the substantial exclusion of microorganisms, known in the industry as "clean fillers," but the greater exclusion of microorganisms provided by aseptic fillers makes aseptic fillers preferable. This is particularly the case in view of the ability of Listeria to grow under refrigerated conditions, as discussed above.

A homogenization step may optionally be included after the product has been maintained at the second predetermined temperature. If a vacuum evaporation and cooling step is included, it is preferably positioned between the recombination step and the homogenization step. The term "homogenize," as used herein, means to subject a product to physical forces to reduce particle size. Such procedures are known in the art, and may be carried out on different types of equipment. It is preferable to carry out this homogenizing step with homogenizing equipment at total pressures of from about 500 p.s.i. to about 3,000 p.s.i.

An apparatus for carrying out the method of the present invention is shown schematically in the FIGURE. This apparatus is readily assembled from commercially available parts. The apparatus of the FIGURE comprises a 150 gallon raw product holding tank 1, 1' for each constituent product line, one line serving as the egg yolk product line for carrying the egg yolk product stream and the other line serving as the egg yolk product line for carrying the egg white product stream. All product lines interconnecting the various portions of the apparatus are formed of conventional sanitary stainless steel tubing. A centrifugal 2, 2' pump for each each holding tank is provided to pump each constituent out of its respective holding tank. A Cherry-Burrell Model E Superplate heater 3, 3' for each constituent product line is provided to bring each constituent product line to a predetermined temperature. A positive piston pump 4, 4' is positioned in each product line after the heater, and a check valve 5, 5' is positioned in each product line after the positive displacement pump and before injector 10. The lengths of the constituent product lines between the heaters and injector are minimized (though they need not be, and need not be equal).

A Cherry-Burrell UHT I-type steam injection heater serves as injector 10 and is connected to each constituent product line so that the egg yolk product stream carried in one product line is injected into the egg white product stream carried in the other product line Thus, the egg yolk serves as the heating media rather than steam, as is conventional with a steam injection heater.

A liquid whole egg product line emenates from the injector. A holding section 11 in the liquid whole egg product line follows the injector, and a flow diversion valve 12 in the liquid whole egg product line following the holding section is provided for shunting improperly treated product to a holding tank (not shown) via a diversion line 13. The length of the holding section 11 is chosen to provide the desired holding time to the liquid whole egg product stream.

A Cherry-Burrell Model HD-6 aseptic homogenizer 14 in the liquid whole egg product line follows the flow diversion valve, a Cherry-Burrell Model 558X8 No-Bac Spiratherm tube-in-shell cooler 15 in the whole egg product line follows the aseptic homogenizer, and a Tetra Pak Model AB-3-250 aseptic filler 20 receives the whole egg product line and aseptically packages the whole egg product stream carried therein in individual cartons.

Liquid egg yolk and liquid egg white may be provided as constituent ingredients by conventional shell egg breaking apparatus, such as a Seymore breaker (not shown). The breaking apparatus may be in the same plant as the pasteurizing apparatus of the invention or in a separate plant.

In use for carrying out a method of the present invention, the apparatus of the FIGURE may, for example, be set so that the heater 3 in the egg white product line heats the egg white product stream to about 62° Centigrade and the heater 3' in the egg yolk product line heats the egg yolk product stream to about 78° C. The positive displacement pumps 4, 4' for the different product lines are set to pump at different predetermined rates so that the constituent product streams are recombined to form a liquid whole egg product containing egg yolk and egg white in the same ratio as in natural whole egg. The constituent product streams recombine to provide a liquid whole egg product stream of about 67° C. The holding section 11 is a length suitable to provide a holding time for the liquid whole egg product stream of about 2.5 minutes to thereby produce a pasteurized liquid whole egg product. To produce a product with greater kills of Listeria, the holding section is lengthened to give a holding time of 3.5 minutes.

A second apparatus for carrying out the method of the present invention is essentially the same as that shown in the FIGURE, except that a chromatography column containing $\beta$-cyclodextrin immobilized on a silica support (as discussed in detail above) is positioned in the egg yolk product line after the pump 2' and before the heater 3'. This apparatus is thereby adapted to produce a reduced cholesterol product.

Those skilled in the art will appreciate that minor variations can be made in the apparatus and procedures described herein without departing from the spirit of the present invention. Thus, the invention is defined by the following claims, with equivalents of the claims to be included therein.

We claim:

1. An apparatus for pasteurizing a liquid whole egg product, comprising:
   (a) an egg yolk product line;
   (b) an egg white product line;
   (c) first pumping means connected to said egg yolk product line for establishing an egg yolk product stream in said egg yolk product line;
   (d) second pumping means connected to said egg white product line for establishing an egg white product stream in said egg white product line;
   (e) a heater connected to said egg yolk product line for heating said egg yolk product stream to a first predetermined temperature;
   (f) recombining means connected to said egg yolk product line after said heater and connected to said egg white product line for producing a whole egg product stream from said egg yolk product stream and said egg white product stream; and
   (g) a whole egg product line connected to said recombining means for receiving said whole egg product stream.

2. An apparatus according to claim 1, further comprising a holding section in said whole egg product line.

3. An apparatus according to claim 2, further comprising an aseptic filler connected to said whole egg product line.

4. An apparatus according to claim 1, wherein said recombining means comprises an injector.

5. An apparatus according to claim 1, wherein said heater comprises a heated surface heat exchanger.

6. An apparatus according to claim 1, further comprising a chromatography column connected to said egg yolk product line, said chromatography column containing cyclodextrin immobilized on a solid support.

7. An apparatus according to claim 1, wherein each of said first and second pumping means comprises a positive displacement pump.

* * * * *